US011029215B2

(12) United States Patent
Cavanaugh

(10) Patent No.: US 11,029,215 B2
(45) Date of Patent: Jun. 8, 2021

(54) LOW CONTACT CLAMP FOR NON-INVASIVE PROCESS FLUID TEMPERATURE INDICATION

(71) Applicant: Rosemount Inc., Shakopee, MN (US)

(72) Inventor: Jack M. Cavanaugh, Saint Louis Park, MN (US)

(73) Assignee: Rosemount Inc., Shakopee, MN (US)

(*) Notice: Subject to any disclaimer, the term of this patent is extended or adjusted under 35 U.S.C. 154(b) by 324 days.

(21) Appl. No.: 16/139,319

(22) Filed: Sep. 24, 2018

(65) Prior Publication Data
US 2020/0096394 A1    Mar. 26, 2020

(51) Int. Cl.
*G01K 1/143* (2021.01)
*F16L 3/16* (2006.01)
(Continued)

(52) U.S. Cl.
CPC ............ *G01K 1/143* (2013.01); *F16L 3/1091* (2013.01); *F16L 3/16* (2013.01); *G01K 13/02* (2013.01)

(58) Field of Classification Search
CPC .............................. G01K 1/143; G01K 13/02
See application file for complete search history.

(56) References Cited

U.S. PATENT DOCUMENTS 8,141,826 B1 * 3/2012 Gallardo ................. F16L 3/243
                                                                248/74.4
9,360,377 B2    6/2016 Converse
(Continued)

FOREIGN PATENT DOCUMENTS

CN    205786481 U    12/2016
CN    2063112280 U    7/2017
(Continued)

OTHER PUBLICATIONS

International Search Report and Written Opinion for International Patent Application No. PCT/US2019/051901, dated Jan. 2, 2020, date of filing: Sep. 19, 2019, 13 pages.
(Continued)

*Primary Examiner* — Nathaniel T Woodward
*Assistant Examiner* — Philip L Cotey
(74) *Attorney, Agent, or Firm* — Christopher R. Christenson; Kelly, Holt & Christenson PLLC

(57) ABSTRACT

A process fluid temperature estimation system includes a sensor capsule having a temperature sensitive element disposed therein configured to sense an external surface of a process pipe. The process fluid temperature estimation system includes measurement circuitry coupled to the sensor capsule and configured to detect a characteristic of the at least one temperature sensitive element that varies with temperature and provide sensor capsule temperature information and a controller coupled to the measurement circuitry, the controller being configured to obtain a reference temperature and employ a heat transfer calculation with the reference temperature and the sensor capsule temperature information to generate an estimated process temperature output. The process fluid temperature estimation system includes a mounting assembly configured to mount the process fluid temperature estimation system to the external surface of the process pipe, wherein a portion of the mounting assembly is offset from the external surface of the process pipe.

11 Claims, 6 Drawing Sheets

(51) Int. Cl.
   *F16L 3/10*   (2006.01)
   *G01K 13/02*   (2021.01)

(56) References Cited

U.S. PATENT DOCUMENTS

| | | | |
|---|---|---|---|
| 10,317,295 B2 | 6/2019 | Rud et al. | |
| 2002/0104929 A1* | 8/2002 | Cunningham | F16L 3/1033 248/49 |
| 2007/0068588 A1* | 3/2007 | Britton | F16L 3/1091 138/106 |
| 2008/0277159 A1* | 11/2008 | Liepold | G01K 1/146 174/480 |
| 2009/0183463 A1* | 7/2009 | Osborn | F16L 3/24 52/745.21 |
| 2012/0056046 A1* | 3/2012 | Seryi | F16L 3/16 248/68.1 |
| 2015/0185085 A1 | 7/2015 | Converse | |
| 2016/0003685 A1* | 1/2016 | Walla | G01K 1/143 374/208 |
| 2016/0047697 A1* | 2/2016 | Decker | G01K 7/02 374/179 |
| 2016/0076689 A1* | 3/2016 | Kato | F16L 55/035 248/636 |
| 2016/0298317 A1* | 10/2016 | Trescott | G01M 3/002 |
| 2017/0212065 A1 | 7/2017 | Rud et al. | |
| 2017/0284870 A1* | 10/2017 | Golden | F16B 2/065 |
| 2019/0277711 A1 | 9/2019 | Rud | |
| 2019/0293241 A1 | 9/2019 | Rud et al. | |
| 2020/0096397 A1* | 3/2020 | Rud | G01K 1/143 |
| 2020/0103287 A1* | 4/2020 | Rud | G01K 1/14 |
| 2020/0103293 A1* | 4/2020 | Rud | G01K 13/02 |

FOREIGN PATENT DOCUMENTS

| | | |
|---|---|---|
| JP | 11325322 A | 11/1999 |
| JP | 2010031948 A | 2/2010 |

OTHER PUBLICATIONS

Application and Drawings for U.S. Appl. No. 16/139,341, filed Sep. 24, 2018, 23 pages.
Application and Drawings for U.S. Appl. No. 16/146,152, filed Sep. 28, 2018, 16 pages.
Application and Drawings for U.S. Appl. No. 16/296,521, filed Mar. 8. 2019, 27 pages.
First Chinese Office Action dated Oct. 16, 2020, for Chinese Patent Application No, 201910183633.3, 21 pages including English translation.
Second Office Action for Chinese Applcation No. 201910183633.3, dated Mar. 18, 2021, 21 pages including English translation.

* cited by examiner

LOW CONTACT CLAMP FOR NON-INVASIVE PROCESS FLUID TEMPERATURE INDICATION

BACKGROUND

Many industrial processes convey process fluids through pipes or other conduits. Such process fluids can include liquids, gasses, and sometimes entrained solids. These process fluid flows may be found in any of a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing abrasive and corrosive slurries.

It is common to place a temperature sensor within a thermowell, which is then inserted into the process fluid flow through an aperture in the conduit. However, this approach may not always be practical in that the process fluid may have a very high temperature, be very corrosive, or both. Additionally, thermowells generally require a threaded port or other robust mechanical mount/seal in the conduit and thus, must be designed into the process fluid flow system at a defined location. Accordingly, thermowells, while useful for providing accurate process fluid temperatures, have a number or limitations.

More recently, process fluid temperature has been estimated by measuring an external temperature of a process fluid conduit, such as a pipe, and employing a heat flow calculation. This external approach is considered non-invasive because it does not require any aperture or port to be defined in the conduit. Accordingly, such non-intrusive approaches can be deployed at virtually any location along the conduit. In some instances, however, the external surface temperature of the conduit may be beyond the normal operating range of the temperature sensor(s). Thus, there is a need to extend the number of applications to which non-invasive process fluid temperature estimation techniques can be applied.

SUMMARY

A process fluid temperature estimation system includes a sensor capsule having a temperature sensitive element disposed therein configured to sense an external surface of a process pipe. The process fluid temperature estimation system includes measurement circuitry coupled to the sensor capsule and configured to detect a characteristic of the at least one temperature sensitive element that varies with temperature and provide sensor capsule temperature information and a controller coupled to the measurement circuitry, the controller being configured to obtain a reference temperature and employ a heat transfer calculation with the reference temperature and the sensor capsule temperature information to generate an estimated process temperature output. The process fluid temperature estimation system includes a mounting assembly configured to mount the process fluid temperature estimation system to the external surface of the process pipe, wherein a portion of the mounting assembly is offset from the external surface of the process pipe.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As set forth above, process fluid temperature has been estimated by measuring an external temperature of a process fluid conduit, such as a pipe, and employing a heat flow calculation. Such systems generally use the pipe skin (external surface) temperature $T_{skin}$ and a reference temperature, such as a transmitter terminal temperature, and thermal impedance values in the heat flow calculation to infer or otherwise estimate the process fluid temperature within the conduit. This feature generally requires the thermal conductivity to be known from the process fluid to the transmitter terminals thus requiring the sensor to generally be connected to the process fluid temperature transmitter.

In an ideal situation, the pipe skin temperature is measured by a temperature sensitive element clamped onto the pipe as close as possible to the external pipe surface. This close coupling allows for improved sensitivity to process fluid temperature changes by reducing time constants resulting from minimal thermal impedance between the temperature sensitive element and the process fluid.

However, the clamps currently used to maintain a close connection between the temperature sensitive element and the external surface of the pipe may also cause some measuring inaccuracies. For example, a clamp that has large surface contact with the pipe may act as a heat sink that influences the accuracy of the temperature sensitive element. For instance, stray heat from the process travels through the clamp into the transmitter which can affect the sensed skin temperature or the sensed reference temperature. Accordingly, a clamp that has minimal surface contact can be used to minimize the effects of thermal stray on measuring accuracy.

Additionally, the clamps currently used, are not optimized for insulating the temperature sensitive element to the process pipe. It may be beneficial to insulate the temperature sensitive element to the external pipe surface to minimize external thermal factors from impacting the sensing. Accordingly, a clamp that has some standoff from the process pipe can be used to accommodate insulation and increase measurement accuracy.

Embodiments described herein generally leverage the advantage of both reducing surface contact between the clamp and process pipe, and standing off the clamp from the process pipe.

Figure 1A:
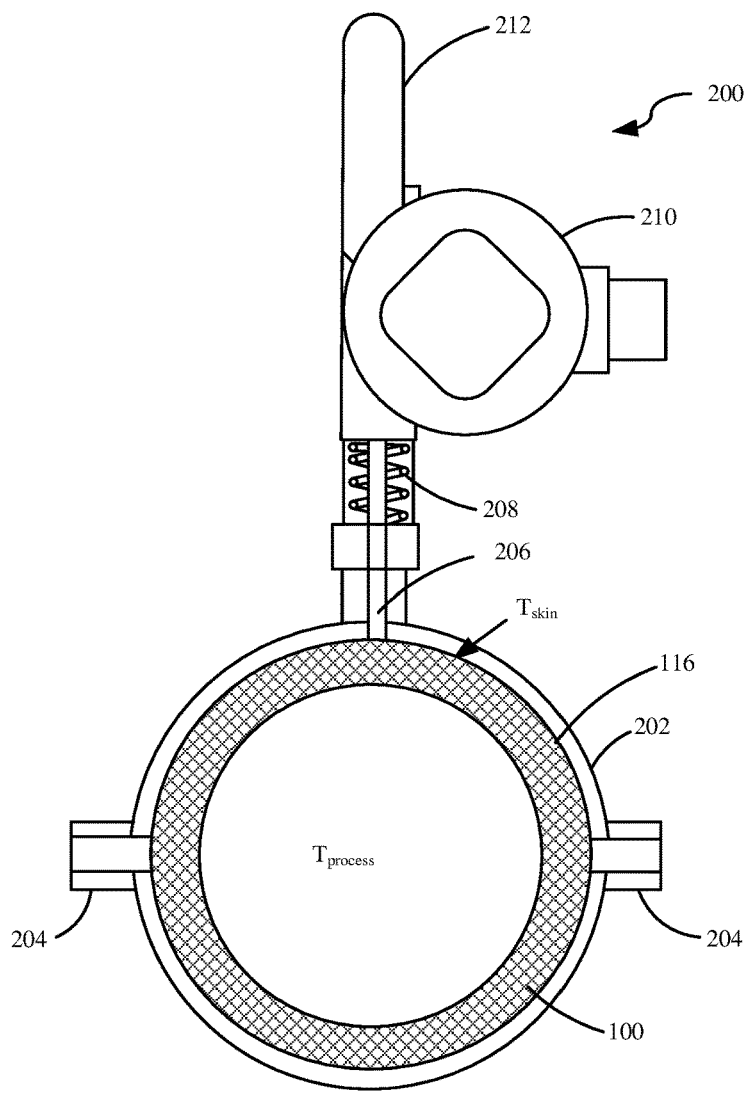
FIG. 1A is a diagrammatic view of a heat flow measurement system with which embodiments of the present invention are particularly applicable.

FIG. 1A is a diagrammatic view showing one example of a heat flow measurement system. As illustrated, system 200 generally includes a pipe clamp 202 that is configured to clamp around conduit or pipe 100. Pipe clamp 202 may have one or more clamp ears 204 in order to allow the clamp portion 202 to be positioned and clamped to pipe 100. Pipe clamp 202 may replace one of clamp ears 204 with a hinge portion such that pipe clamp 202 can be opened to be positioned on a pipe and then closed and secured by clamp ear 204. While the clamp illustrated with respect to FIG. 1 is particularly useful, any suitable mechanical arrangement for securely positioning system 200 about an exterior surface of a pipe can be used in other examples.

System 200 includes heat flow sensor capsule 206 that is urged against external surface 116 of pipe 100 by spring 208. The term "capsule" is not intended to imply any particular structure or shape and can thus be formed in a variety of shapes, sizes and configurations. While spring 208 is illustrated, those skilled in the art will appreciate that various techniques can be used to urge sensor capsule 206 into continuous contact with external surface 116. Sensor capsule 206 generally includes one or more temperature sensitive elements, such as resistance temperature devices (RTDs). Sensors within capsule 206 are electrically connected to transmitter circuitry within housing 210, which is configured to obtain one or more temperature measurements from sensor capsule 206 and calculate an estimate of the process fluid temperature based on the measurements from sensor capsule 206, and a reference temperature, such as a temperature measured within housing 210, or otherwise provided to circuitry within housing 210.

In one example, the basic heat flow calculation can be simplified into:

$$T_{corrected} = T_{skin} + (T_{skin} - T_{reference}) * (R_{pipe}/R_{sensor}).$$

In this equation, $T_{skin}$ is the measured temperature of the external surface of the conduit. Additionally, $T_{reference}$ is a second temperature obtained relative to a location having a fixed thermal impedance ($R_{sensor}$) from the temperature sensor that measures $T_{skin}$. $R_{pipe}$ is the thermal impedance of the conduit and can be obtained manually by obtaining pipe material information, pipe wall thickness information. Additionally, or alternately, a parameter related to $R_{pipe}$ can be determined during a calibration and stored for subsequent use. Accordingly, using a suitable heat flux calculation, such as that described above, circuitry within housing 210 is able to calculate an estimate for the process fluid temperature ($T_{corrected}$) and convey an indication regarding such process fluid temperature to suitable devices and/or a control room.

Figure 1B:
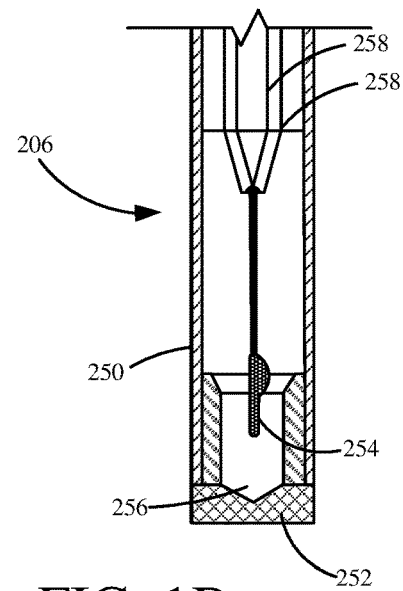
FIG. 1B is a diagrammatic cross-sectional view of a sensor capsule with which embodiments of the present invention are particularly applicable.

FIG. 1B is a diagrammatic view of a sensor capsule with which embodiments of the present invention are particularly applicable. Sensor capsule 206 generally includes a cylindrical side wall 250 with an endcap 252 coupled thereto. In one example, endcap 252 is formed of silver. One or more RTD elements 254 are disposed proximate endcap 252 and are provided in thermal communication with endcap 252 via thermal grease 256. Conductors 258 electrically couple RTD element(s) 254 to measurement circuitry within housing 210. In one embodiment, element 254 is formed in accordance with thin-film RTD technology. Thin-film RTDs are generally considered to be very rugged and generally low cost. A thin-film element is typically manufactured by coating a small ceramic chip with a very thin (such as 0.0001 inch) film of a temperature-sensitive metal (such as platinum) and then laser cutting or chemical or chemical etching as resistance path in the metal film.

Figure 2:
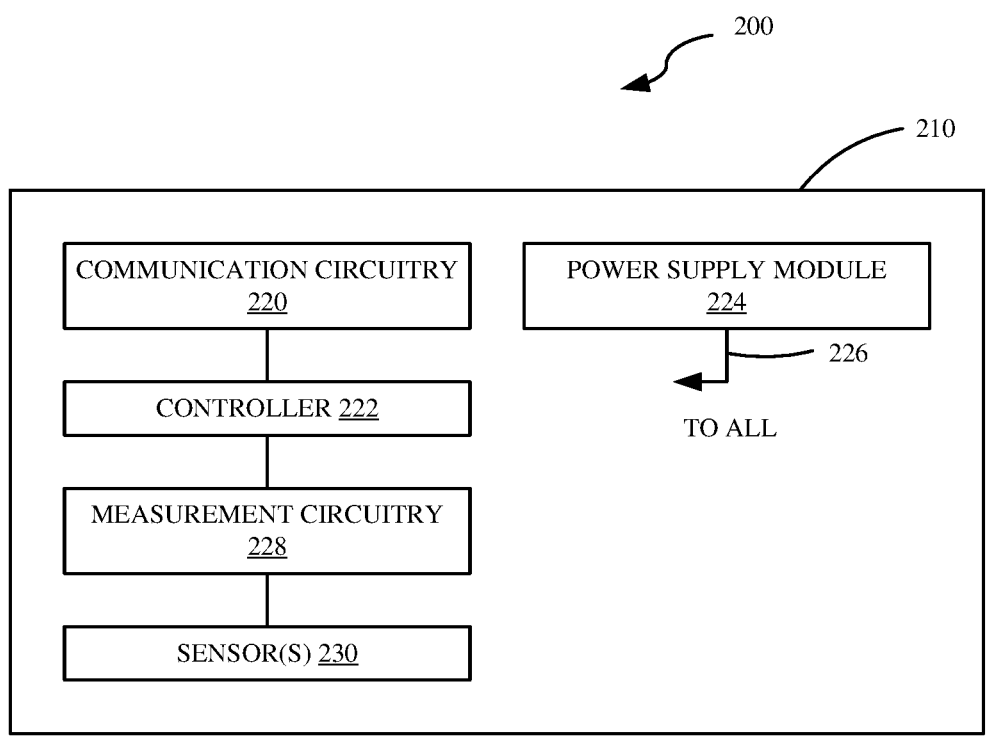
FIG. 2 is a block diagram of circuitry within a heat flow measurement system, within a heat flow measurement system.

FIG. 2 is a block diagram of circuitry within housing 210 of heat flow measurement system 200, with which embodiments of the present invention are particularly applicable. System 200 includes communication circuitry 220 coupled to controller 222. Communication circuitry 220 can be any suitable circuitry that is able to convey information regarding the estimated process fluid temperature. Communication circuitry 220 allows heat flow measurement system 200 to communicate the process fluid temperature output over a process communication loop or segment. Suitable examples of process communication loop protocols include the 4-20 milliamp protocol, Highway Addressable Remote Transducer (HART®) protocol, FOUNDATION™ Fieldbus Protocol, and the WirelessHART protocol (IEC 62591).

Heat flow measurement system 200 also includes power supply module 224 that provides power to all components of system 200 as indicated by arrow 226. In examples where heat flow measurement system 200 is coupled to a wired process communication loop, such as a HART® loop, or a FOUNDATION™ Fieldbus segment, power module 224 may include suitable circuitry to condition power received from the loop or segment to operate the various components of system 200. Accordingly, in such wired process communication loop embodiments, power supply module 224 may provide suitable power conditioning to allow the entire device to be powered by the loop to which it is coupled. In other examples, when wireless process communication is used, power supply module 224 may include a source of power, such as a battery and suitable conditioning circuitry.

Controller 222 includes any suitable arrangement that is able to generate a heat-flow based process fluid temperature estimate using measurements from sensor(s) within capsule 206 and an additional reference temperature, such as a terminal temperature within housing 210. In one example, controller 222 is a microprocessor. To communicate the estimate to other devices, controller 222 is communicatively coupled to communication circuitry 220.

Measurement circuitry 228 is coupled to controller 222 and provides digital indications with respect to measurements obtained from one or more temperature sensors 230. Measurement circuitry 228 can include one or more analog-to-digital converters and/or suitable multi-plexing circuitry to interface the one or more analog-to-digital converters to sensors 230. Additionally, measurement circuitry 228 can include suitable amplification and/or linearization circuitry as may be appropriate for the various types of temperature sensors employed.

Figure 3:
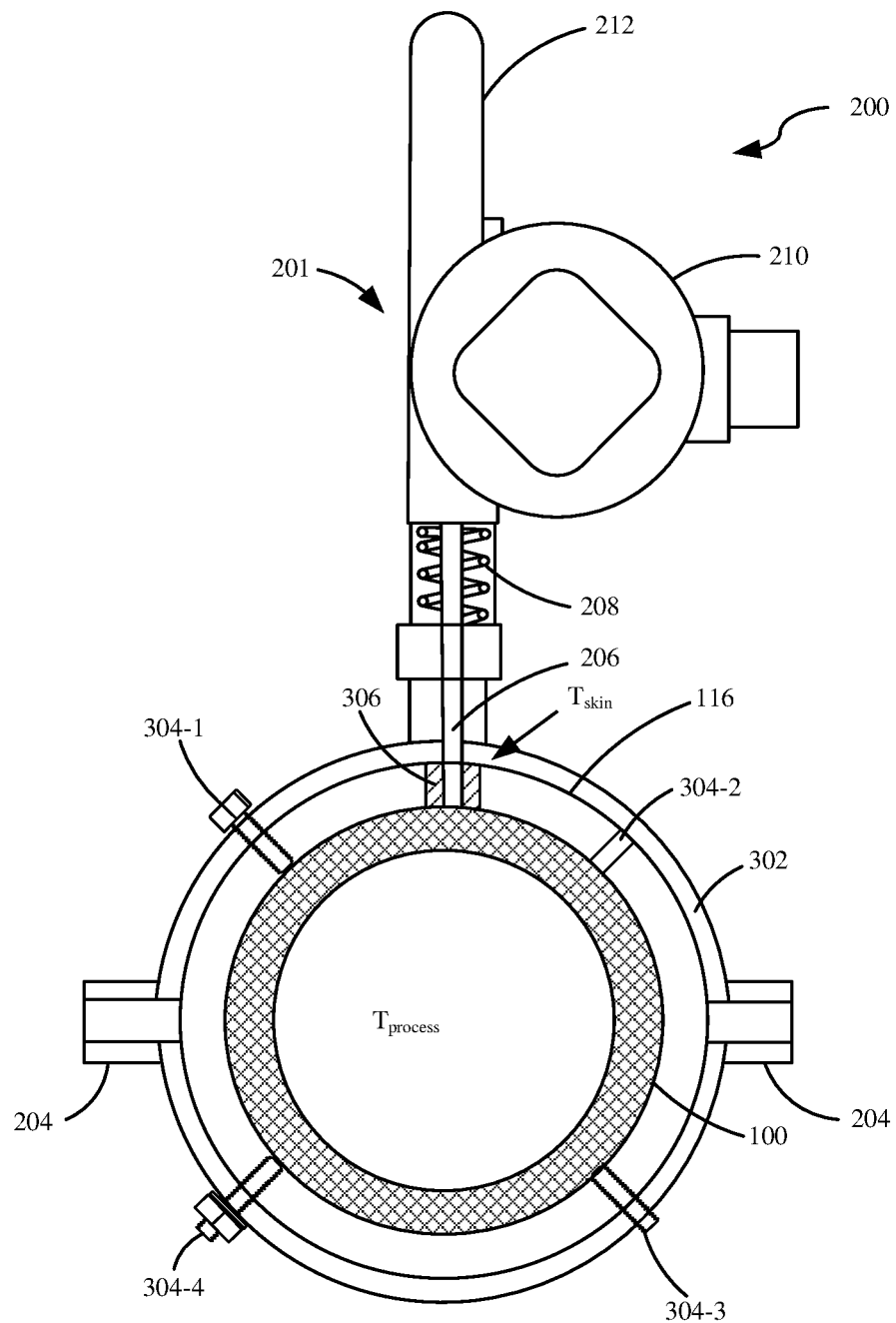
FIG. 3 is a diagrammatic view of a high temperature heat flow measurement system.

FIG. 3 is a diagrammatic view of a heat flow measurement system with which embodiments of the present invention are particularly applicable. FIG. 3 bears many similarities to the embodiment shown in FIG. 1A, and like components are numbered similarly. The main difference between the embodiment shown in FIG. 3 and that of FIG. 1A is the type of clamp that is used to secure sensor capsule 206 proximate pipe 100.

As shown in FIG. 3, clamp 302 replaces clamp 202 of FIG. 1A. Clamp 302 is similar in design to clamp 202 in that, clamp 302 includes ears 204 and couples to the sensor assembly 201. Clamp 302 differs from clamp 202 in that, clamp 302 does not contact pipe 100. Instead, clamp 302 is held a given distance away from pipe 100 by standoffs 304.

Illustratively, there are four standoffs: standoff 304-1, standoff 304-2, standoff 304-3 and standoff 304-4. In a typical scenario, the plurality of standoffs will be the same type. As shown each standoff 304 is a different type of standoff. This is for illustrative purposes only to show different examples of standoffs that may be used to secure a clamp to a pipe (e.g., clamp 302 or clamp 402). For example, standup 304-1 includes a bolt, machine screw or a similar fastener. Stand of 304-2 includes a shaft coupled to clamp 302. Standoff 304-3 includes a set screw. Standoff 304-4 includes a threaded rod and a nut and lock washer. Of course, other types of standoffs can be used as well.

Also shown in FIG. 3 is insulation 306. Installation 306 is located around the junction of sensor capsule 206 and pipe 100. Insulation 306 may act to reduce external thermal sources from influencing the accuracy of measuring the temperature $T_{skin}$. In one example, insulation 306 can be disposed more than around the junction of capsule 206 and pipe 100. In some examples, insulation 306 can be disposed into the entire gap between the inside diameter of clamp 302 and the outside diameter of pipe 100.

Figure 4:
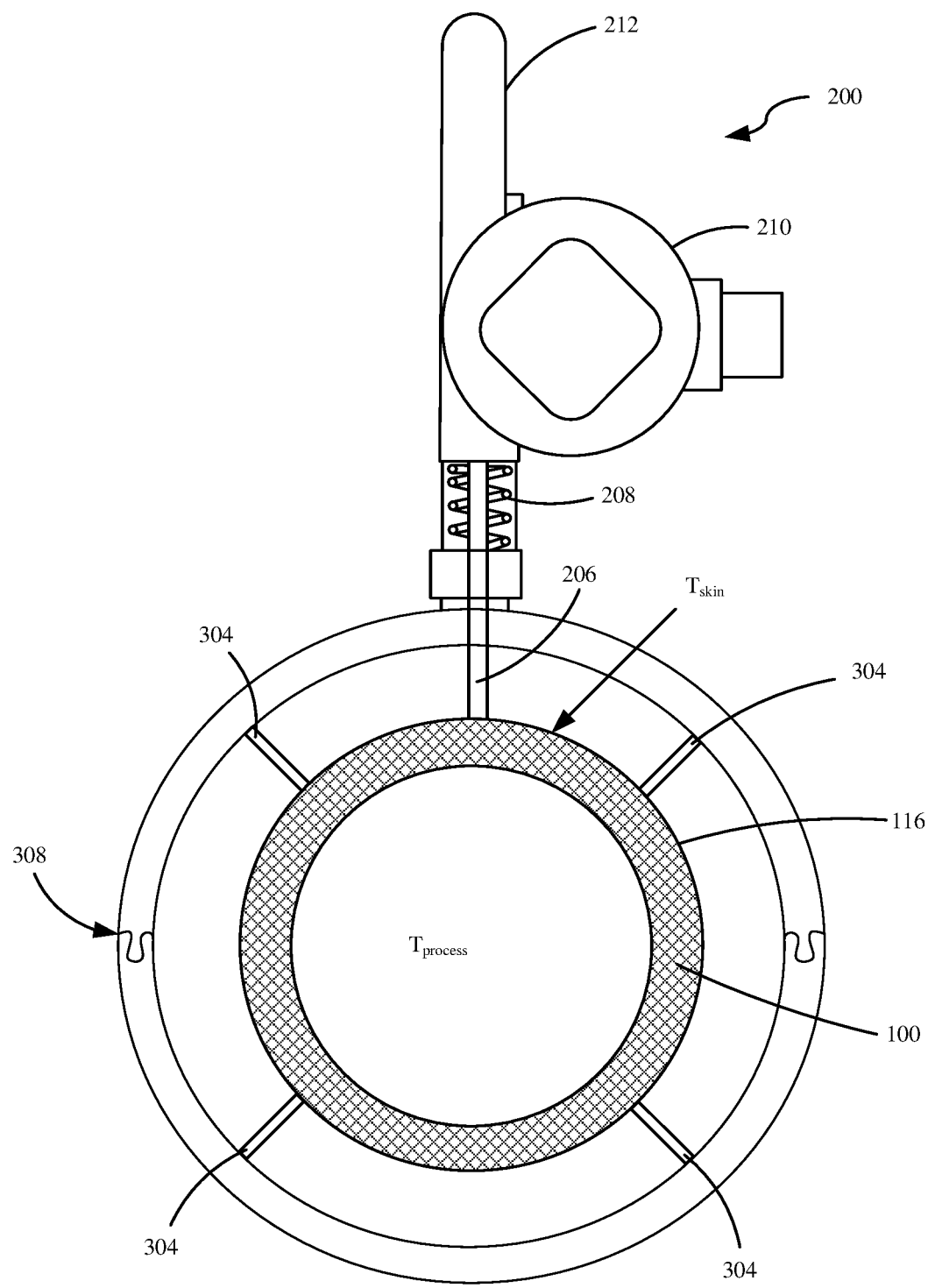
FIG. 4 is a diagrammatic view of high temperature heat flow measurement system in accordance of another embodiment of the present invention.

FIG. 4 is a diagrammatic view showing one example of a heat flow measurement system. FIG. 4 bears many similarities to the example shown in FIGS. 1A and 3, and like components are numbered similarly. A difference between the example shown in FIG. 4 and that of FIG. 3 is the type of clamp or mounting assembly that is used to secure sensor capsule 206 proximate pipe 100.

As shown in FIG. 4 clamp 402 replaces clamp 202 of FIG. 1A and clamp 302 of FIG. 3. Clamp 402 similar to clamp 302 of FIG. 3 has standoffs 304. Unlike clamp 302 or 202, clamp 402 does not have ears 204. Instead, clamp 402 is assembled over pipe 100, and held together by mating interface 308. Mating interface 308 includes mating features 310 cut into pieces of clamp 402 via wire electrical discharge machining (EDM), waterjet machining, standard machine, etc.

Figure 5:
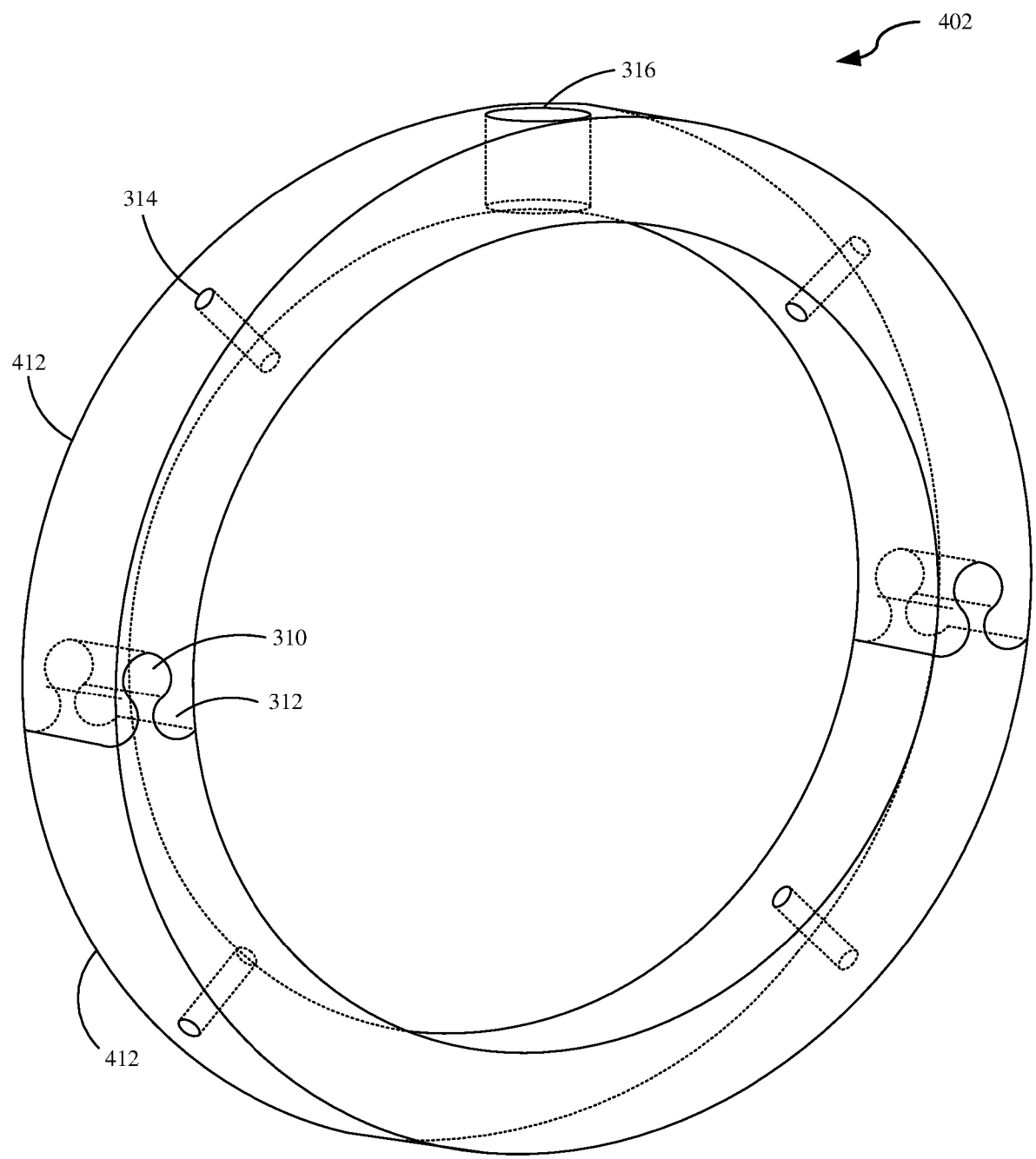
FIG. 5 is a perspective view of one example of a clamp system.

FIG. 5 is a perspective view showing one example of a clamp 402. As shown, clamp 402 includes two pieces 412. In another example, clamp 402 may include a singular piece 412. In other examples, clamp 402 may include more than two pieces 412. For example, clamp 402 may include the four quarter pieces 412 instead of the shown two half pieces 412. To couple pieces 412 together, each piece 412 includes either a mating feature 310 or a mating feature 312. Of course, the shape of mating features 310 and 312 may be different in other examples.

Clamp 402 can be made out of a variety of different materials including, but not limited to, steel, stainless steel, brass, etc.

Clamp 402 as shown includes a variety of standoff apertures 314. Standoff apertures 314 receive and couple to standoffs 304 to mount clamp 402 to a process pipe. For example, standoff apertures 314 can include threads that couple to threads of a standoff. An advantage of using standoffs when mounting a clamp is that the acceptable clamp sizing tolerance is increased. For example, a clamp using standoffs can be largely oversized relative to the pipe it is coupling to, as long as larger standoffs are used. Whereas in the past, many different clamp sizes were required for use with different sized pipes.

As shown, there are four standoffs 304, however in other examples there may be more than three standoffs 304. Also shown, standoff 304 are comprised of a single material. In other examples, standoff 304 may comprise more than one material. For instance, the majority of standoff 304 may comprise of a structural material (e.g. stainless steel) while the portion of standoff 304 contacting the process pipe comprises a material with a specific desired thermal property, such as high temperature resistance. Since the contact surface area is reduced, a more exotic material may be used cost-effectively at the end of each standoff 304. With past clamps, using an exotic material was cost ineffective because it had to cover the entire inner surface area of the clamp that contacted the process pipe.

Figure 6:
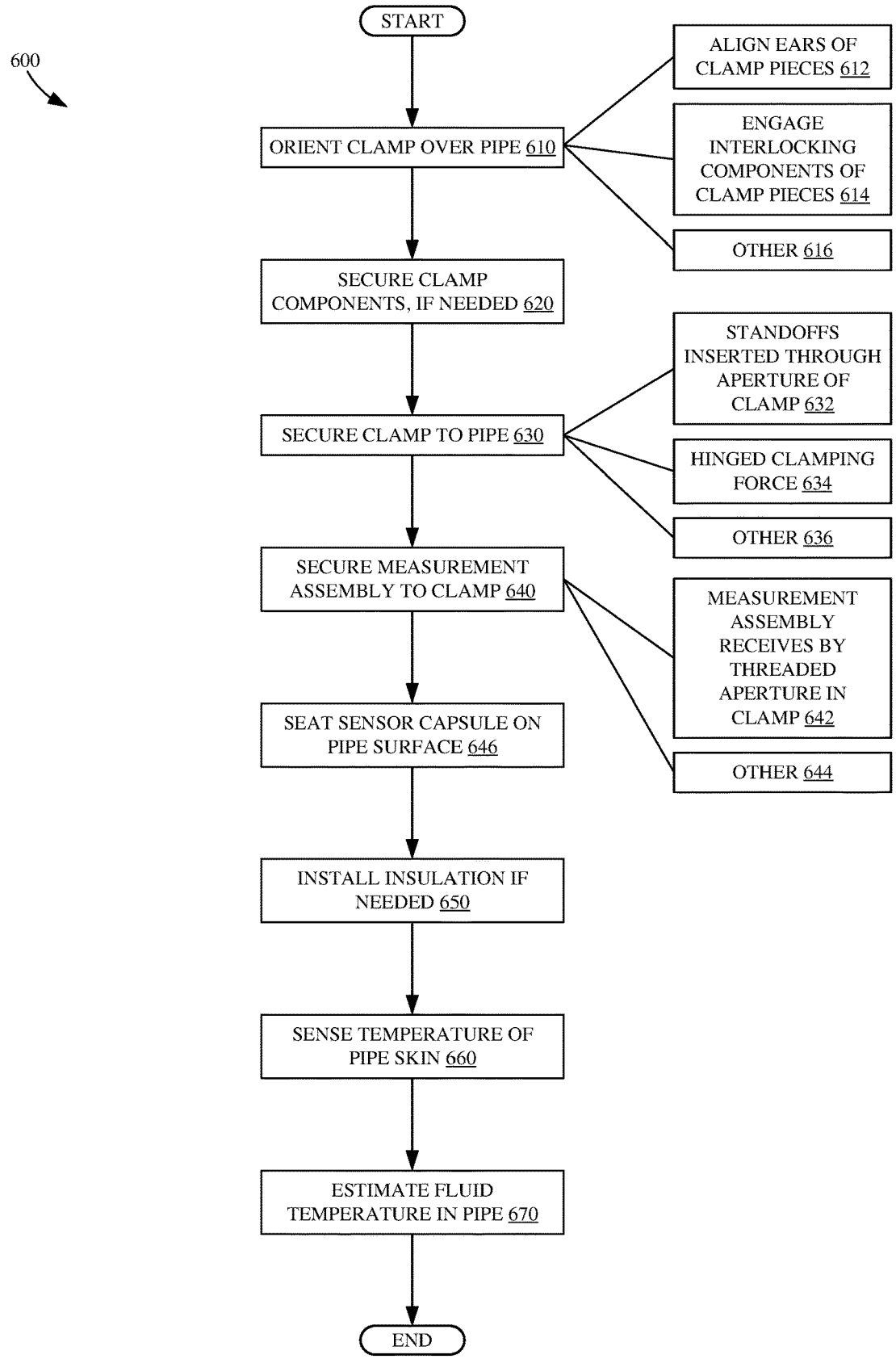
FIG. 6 is a method of operation of one example of a heat flow measurement system.

FIG. 6 is a flow diagram showing one example of operation of the systems described above. Operation 600 is described with respect to the components of FIG. 4, however, operation 600 may be used with other systems as well.

Operation 600 begins at block 610 where the clamp is oriented over the process pipe. Orienting the clamp over a process pipe can involve aligning the ears of each clamp piece, as indicated by block 612. For example, aligning ears 204 of the clamp pieces of clamp 302 in FIG. 3. Orienting the clamp over a process pipe can involve engaging interlocking components of the claimed pieces, as indicated by block 614. For example, engaging the interlocking components of clamp 402 at mating interface 308, in FIG. 4. Of course, orienting the clamp over a process pipe can involve other steps as well, as indicated by block 616.

Operation 600 continues at block 620 where the clamp components are secured, if needed. For example, ears 204 of the clamp pieces of clamp 302 in FIG. 3, must be bolted or otherwise coupled together to remain secure over the process pipe.

Operation 600 continues at block 630 where the clamp is secured to the process pipe. The clamp can be secured to the process pipe by threaded fasteners inserted through apertures of the clamp, such as, for example, standoffs 304 inserted through standoff apertures 314 of clamp 402. Standoff 304 can have threaded features that mate with threaded features of standoff apertures 314, that allow standoff 304 to be tightened on to pipe 100.

Operation 600 continues at block 640 where the measurement assembly is secured to the clamp. Securing the measurement assembly to the clamp can be accomplished by measurement assembly being received by a threaded aperture include in the clamp, as indicated by block 622. For example, measurement assembly, having a threaded portion that corresponds to threads in measurement assembly aperture 316, is threaded into measurement assembly aperture 316. The measurement assembly can be secured to the clamp in other ways as well, as indicated by block 644. For example, the measurement assembly can be secured to a portion of the clamp before the clamp is placed over the pipe for connection.

Operation 600 continues at block 650 where, if desired, measurement 206 is insulated to an external surface of pipe 100. For example, insulation 306 is installed around the junction between measurement 206 and pipe 100, to reduce external thermal sources from affecting the measurement of pipe 100.

Operation 600 continues at block 660 where measurement 206 senses a temperature of an external surface of pipe 100. At block 670, based on the output of measurement 206 a temperature of fluid in pipe 100 can be estimated using the measured temperature of the external surface of pipe 100, a reference temperature and thermal conductivity information relating heat flow from the external surface of the pipe to a fixed reference temperature location.

Although the present invention has been described with reference to preferred embodiments, workers skilled in the art will recognize that changes may be made in form and detail without departing from the spirit and scope of the invention.

What is claimed is:

1. A process fluid temperature estimation system comprising:
    a sensor capsule having at least one temperature sensitive element disposed therein configured to sense an external surface of a process pipe;
    measurement circuitry coupled to the sensor capsule and configured to detect a characteristic of the at least one temperature sensitive element that varies with temperature and provide sensor capsule temperature information; and
    a controller coupled to the measurement circuitry, the controller being configured to obtain a reference temperature and employ a heat transfer calculation with the reference temperature and the sensor capsule temperature information to generate an estimated process temperature output; and
    a mounting assembly configured to mount the process fluid temperature estimation system to the external surface of the process pipe, the mounting assembly comprising:
        a clamp body offset from the external surface of the process pipe; and
        a standoff configured to contact the external surface of the process pipe and to offset the clamp body from the external surface of the process pipe, wherein the standoff is actuatable to adjust the offset between the clamp body and the external surface of the process pipe.

2. The process fluid temperature estimation system of claim 1, wherein the standoff comprises a threaded portion configured to engage a corresponding threaded portion of the clamp body.

3. The process fluid temperature estimation system of claim 1, wherein the standoff comprises a plurality of posts coupled to the clamp body for contacting the external surface of the process pipe.

4. The process fluid temperature estimation system of claim 1, wherein the standoff directly contacts the external surface of the process pipe and comprises a contact portion configured to directly contact the external surface of the process pipe, the contact portion comprising a different material than another portion of the standoff.

5. The process fluid temperature estimation system of claim 1, wherein the clamp body comprises two or more interlocking pieces configured to be coupled together on an installed process pipe, such that a flow of the process pipe continues during coupling of the two or more interlocking pieces.

6. The process fluid temperature estimation system of claim 1, further comprising insulation disposed between a portion of the mounting assembly and the process pipe.

7. The process fluid temperature estimation system of claim 6, wherein the insulation is disposed around the sensor capsule, insulating the sensor capsule to the external surface of the process pipe.

8. The process fluid temperature estimation system of claim 1, wherein the clamp body comprises an aperture configured to receive and couple to the sensor capsule.

9. The process fluid temperature estimation system of claim 1, wherein the clamp body comprises at least a first piece and a second piece, the first piece and second piece configured to interlock.

10. The process fluid temperature estimation system of claim 9, wherein a body of one of the first piece or second piece has an at least one protrusion formed therein and a body of the other one of the first piece or second piece has a slot formed therein configured to receive the protrusion.

11. The process fluid temperature estimation system of claim 1, wherein actuation of the standoff in a first direction increases the offset between the clamp body and the external surface of the process pipe and actuation of the standoff in a second direction decreases the offset between the clamp body and the external surface of the process pipe.

* * * * *